Jan. 6, 1953  R. C. MULFINGER  2,624,617
LATHER MIXING MACHINE
Filed Dec. 7, 1946

INVENTOR.
Rudolph C. Mulfinger
BY
Sam J. Slotsky
ATTORNEY

Patented Jan. 6, 1953

2,624,617

UNITED STATES PATENT OFFICE 2,624,617

LATHER MIXING MACHINE

Rudolph C. Mulfinger, Sioux City, Iowa, assignor to Andis Clipper Company, Racine, Wis., a corporation of Wisconsin Application December 7, 1946, Serial No. 714,759

3 Claims. (Cl. 299—83)

My invention pertains to a machine for forming lather.

An object of my invention is to provide a compact device which will efficiently form a high quality of lather by using a rotating cake of soap and by applying the principle of centrifugal action therewith.

A further object of my invention is to provide a jet of liquid across the soap area, such jet being positioned off-center of the cake of soap and at a slight angle to provide a highly efficient lather forming device, and whereby the cake of soap will not be split by means of fissures which would otherwise be true wherein the jet would be applied centrally.

Figure 1:
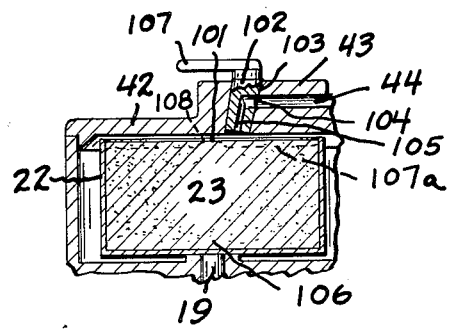
Figure 2:
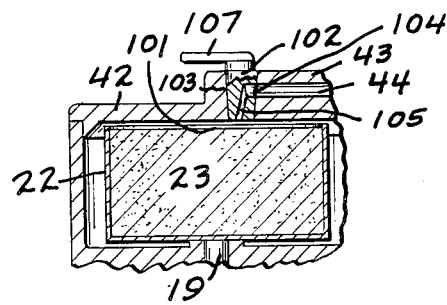
Figure 3:
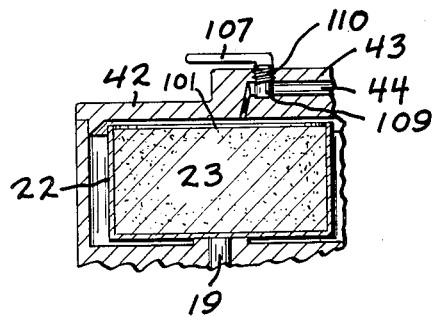

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a sectional view showing the principal jet opening and the cake of soap, Figure 2 is a slight modification, and Figure 3 is a further modification.

My invention is a continuation in part of my co-pending application, Serial Number 600,104, filed June 18, 1945 on a lather making machine, and since most of the features in the above mentioned co-pending application are practically identical to that in the present application, I shall use the same characters herein for designating the same parts, with further characters designating modifications or improvements.

In order to prevent confusion with the above mentioned co-pending application, all new parts will be numbered above 100.

In my co-pending application, I have described a lather making machine in which a casing was provided, in which casing a bar of soap mounted on a vertical axis was rapidly rotated by means of an electric motor, and at the same time a jet of warm water was forced by means of a suitable pump into the center of the cake of soap, the rotation of the cake thereby setting up a centrifugal action causing a dispersion effect whereby the soap and water mixed to provide a lather, with further attendant structure to increase the formation of lather.

The character 22 designates the cup and the character 23 the cake of circular soap which is placed in this cup. The shaft which rotates the cake of soap is indicated by the character 19, which shaft is driven by means of an electric motor as stated hereinabove. The top wall of the casing is indicated generally by the character 42 which includes an upwardly projecting boss 43. The water which is heated by a suitable electric resistor is forced by means of a small pump through the opening 44.

The center point of the cake of soap is indicated by the character 101, and in my above mentioned co-pending application, the jet of warm water was directed directly vertically downwardly at the point 101. I have found, however, that certain objectionable effects were caused by directing the jet centrally, and that the lather was not formed as efficiently as the arrangement to be described hereinafter, and I have also found that the central positioning of the jet caused an eroding action centrally of the cake of soap which in time caused radial cracks or fissures to develop which hindered the lather forming action somewhat, and also these fissures would become larger and portions of the cake of soap would be jammed against the periphery of the cup 22 in which case the absence of a complete uniform cake of soap would wear away the soap unevenly, and in some cases would require removal of the broken away portions and insertion of a new cake.

To eliminate the above mentioned objectionable features, I have found that the jet should be positioned at a slight distance from the center of the cake of soap and should be inclined angularly toward the center portions of the cake of soap toward the bottom thereof.

I have, therefore, provided a tapered valve member 102 which valve member is seated in a tapered cavity 103 with the valve including a port 104 registering with the opening 44, and with the valve including the jet opening 105 positioned angularly as shown and at a certain distance from the center 101 of the cake of soap, with a continuation of the center line of the opening 105 projecting to the center line of the cake of soap approximately towards the bottom thereof or at the approximate point 106. A control handle 107 is attached to the valve for closing or opening the jet, or for providing an adjustable stream. The resulting structure provides a uniform erosion of the bar of soap, at first as approximately indicated by the dotted lines character 107a with a small hill being formed at 108, this hill being gradually eroded away as the upper level of the soap is removed and as a result the entire cake of soap is uniformly used together with the above mentioned advantages resulting.

Figure 2 illustrates a further modification with the characters designating identical parts in which structure however, the tapered valve 102 is positioned vertically instead of at an angle, with the opening 105 however being positioned angularly with respect to the valve.

Figure 3 illustrates a further modification wherein the valve structure above described is not used in the form shown, and instead a vertically positioned pin 109 includes the threaded portion 110 which is threadably engaged with the boss 43, whereby movement of the handle 107 will correspondingly cause the member 109 to completely close the opening 44 or release the same to allow the stream of water to pass therethrough, and with the opening 111 being positioned at the same angle as above described and at a distance from the center of the cake of soap, all of the above described modifications covering the same principle of the invention of the jet at a slight distance from the center of the cake of soap and directed angularly downwardly.

It will now be seen that I have provided the advantages mentioned in the objects of my invention with further advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. For use with a revoluble mounting for a cake of soap and a cake of soap supported thereby for the purpose described, a nozzle and connections for liquid supply thereto for the projection of a jet of liquid to the soap, said nozzle being positioned and directed to project a steam of liquid toward the center of the cake of soap but at an angle to the axis of its rotation.

2. For use with a cake of soap and a revoluble mounting for the cake whereby to spin the cake at a speed adapted to effect a centrifugal erosion of the soap by any liquid on an exposed surface thereof, a nozzle and connections for liquid supply thereto positioned for the projection of a stream of liquid toward said surface, the angle of said nozzle and stream being acute with respect to the axis of rotation of the soap.

3. In apparatus for the purposes described a revoluble cup on an upwardly directed revoluble shaft, a soap cake in the cup positioned to expose an upwardly facing surface of soap to be eroded, a nozzle positioned above the soap and provided with connections for liquid supply for projection as a jet to erode said surface by the kinetic energy of the jet and by centrifugally changed direction of the stream of liquid, the position and angle of the nozzle being offset with reference to the vertical axis of rotation of the cup.

RUDOLPH C. MULFINGER.

REFERENCES CITED

The following references are of record in the file of this patent:

UNITED STATES PATENTS

| Number | Name | Date |
|---|---|---|
| 606,713 | Gulick | July 5, 1898 |
| 1,260,777 | Kirkegaard | Mar. 26, 1918 |
| 1,623,248 | Joseph et al. | Apr. 5, 1927 |
| 1,740,879 | Sonner | Dec. 24, 1929 |
| 1,786,561 | Collenburg | Dec. 30, 1930 |
| 1,908,141 | Graff | May 9, 1933 |
| 2,175,321 | Saffir | Oct. 10, 1939 |
| 2,235,278 | Brunner | Mar. 18, 1941 |
| 2,301,691 | Ellinger et al. | Nov. 10, 1942 |

FOREIGN PATENTS

| Number | Country | Date |
|---|---|---|
| 17,971 | Great Britain | Sept. 26, 1895 |